United States Patent [19]
Raser

[11] 3,916,186
[45] Oct. 28, 1975

[54] SPINNING-VANE SHAFT POSITION ENCODER

[76] Inventor: William H. Raser, 6451 W. 83rd St., Los Angeles, Calif. 90045

[22] Filed: Apr. 22, 1974

[21] Appl. No.: 463,106

[52] U.S. Cl...... 250/231 SE; 250/237 R; 340/347 P
[51] Int. Cl.² .......................................... G01D 5/34
[58] Field of Search .......... 250/231 R, 231 SE, 236, 250/237; 340/347 P, 190; 235/926 C

[56] References Cited
UNITED STATES PATENTS

| | | |
|---|---|---|
| 3,278,929 | 10/1966 | Susor .............................. 340/347 P |
| 3,454,777 | 7/1969 | Marcus .......................... 250/237 SE |
| 3,513,461 | 5/1970 | Hawley ........................... 340/347 P |
| 3,534,361 | 10/1970 | Foley ............................... 340/347 P |
| 3,758,949 | 9/1975 | Fausel .......................... 250/231 SE |

Primary Examiner—James W. Lawrence
Assistant Examiner—D. C. Nelms

[57] ABSTRACT

An analog-to-digital converter is disclosed which reads the positions of one or more coaxial shafts in terms of time intervals produced by some optical scanning in which a revolving vane participates. The time intervals are measured by a pulse counter. If two shafts are encoded, vanes intercept three light beams per revolution.

8 Claims, 3 Drawing Figures

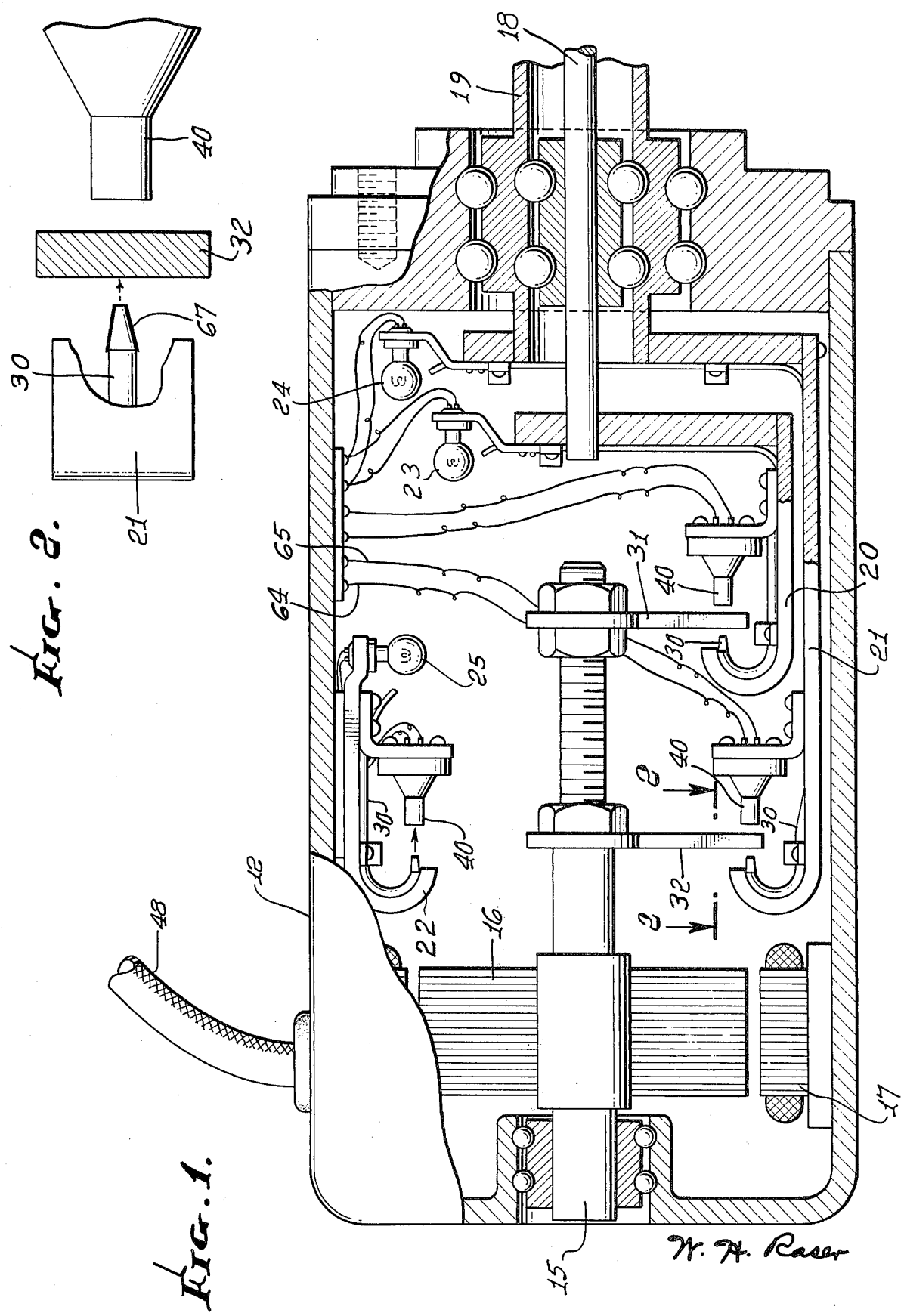

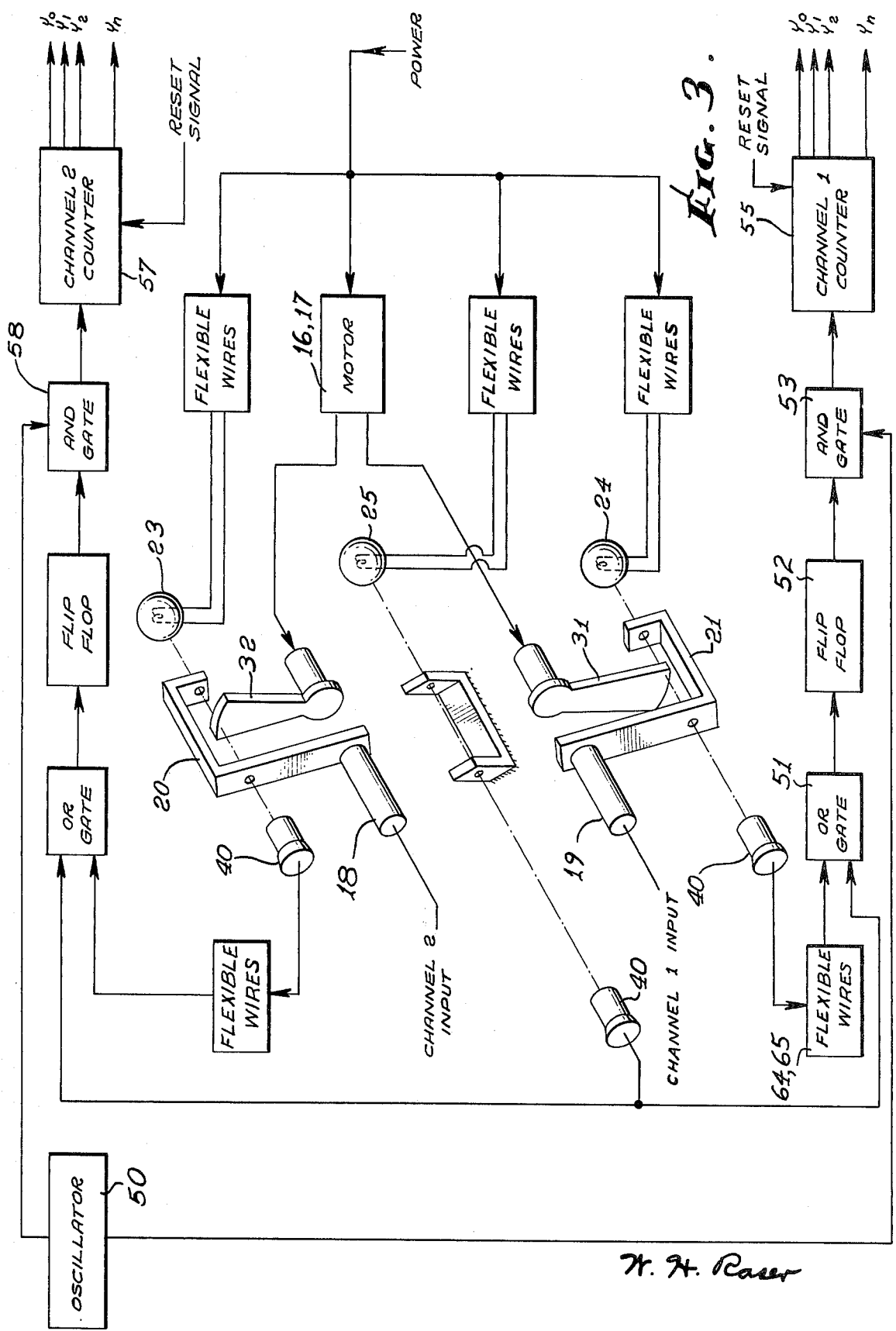

SPINNING-VANE SHAFT POSITION ENCODER

This is an improvement of my U.S. Pat. No. 3,831,169, entitled "Opaque-Vane Analog to Digital Converter," filed May 15, 1972.

References Cited
U.S. Pat. Nos:
3,098,152 Von Mathes
3,278,929 Susor
3,346,724 Fuhrmeister et al.
3,349,325 Bajars
3,454,777 Marcus

BACKGROUND

The present invention relates to the digital encoding of analog displacements and, particularly, to the making of digital measurements of rotational positions of one or more coaxial shafts. This discussion will consider first the determining of the angular position of just one shaft.

The most common type of shaft angle encoder is the absolute shaft encoder where angular position is determined by means of a coded disk that is provided with a number of concentric tracks, each having alternative transparent and opaque means or sectors. In such encoders, a lamp on one side of the disk and a light-responsive cell on the other side, confront a point on each coded track. Production of such encoders involves the difficulty of working with transparent material, the expense of producing accurate coding tracks on such material, and problems associated with positioning the multiplicity of lamps and photocells to minimize cross talk. As the resolution is improved, greater crowding makes it necessary to collimate to avoid dispersal of light around the edges of an opaque sector and the imperfections in glass or plastic raise other problems.

The next most common type of shaft encoder is the incremental shaft encoder. This uses a disc similar to that of the absolute encoder except that only two and sometimes one concentric coded track are used instead of many. The incremental encoder avoids the complexity and crowding of many optical scanning systems but requires extensive means for determining initial shaft position because such determination is not possible from information coming from only two tracks. This reliance on initial determination sometimes allows errors to accumulate.

Many of these mechanical, optical and reliability difficulties are eliminated if the disk element is required to produce just one simple waveform. Recent large-scale integration of semiconductor circuits provides a means of counting pulses with inexpensive integrated circuits. If, from an element mounted on a shaft, a single pulse is generated which has a pulsewidth proportional to the encoder shaft angle position and if an oscillator output is modulated with this single pulse, the number of pulses that result will be proportional to the shaft angle. The counter that counts these pulses in the present invention can be called an up counter. In an incremental encoder, an up-down counter is required because the disk of the incremental encoder provides only what information is needed to change the count, namely, the positive or negative increments as they occur.

The up-down counter of the incremental encoder is obviously more complicated than a one-directional (up) counter used in the present invention. In U.S. Pat. No. 3,098,152, P. von Mathes describes an incremental encoding means although it is not a completely typical incremental encoder for two reasons: first, it uses a gear differential or other means for subtracting pulses in place of the more common down-counting system and, second, it uses two one-track disks instead of the more typical single two-track disk. In U.S. Pat No. 3,454,777, Marcus discloses an incremental encoder capable of up and down counting using a single disk using only one track. The present invention is fundamentally different from all incremental encoders because it is capable of making absolute position measurements.

PURPOSE OF THE INVENTION

It is the purpose of this invention to provide an optical analog-to-digital converter which has the reliability and versatility of the typical absolute encoder, the mechanical simplicity and low cost of the typical incremental encoder, and a capability for accuracy beyond that of either. In almost every angle-measuring device of any kind, accuracy can be improved by performing the measuring process at a larger radius. Therefore, it is part of the purpose of this invention to provide the simplicity and configurational characteristics which lend themselves to the construction of encoders of relatively large radius.

It is a further object of this invention to provide a configuration which is adaptable to the encoding of several independent coaxial shafts. For example, U.S. Pat. No. 3,346,724 discloses a machine for which a two-input coaxial encoder might be desirable.

Other objects and advantages of the present invention will be more readily apparent from what follows.

BRIEF DESCRIPTION OF THE DRAWINGS

FIG. 1 is an elevational sectional view of the mechanical part of the preferred embodiment of this invention.

FIG. 2 is a plan sectional view of some electro-optical elements of FIG. 1.

FIG. 3 is a perspective view of the moving vanes and the electro-optical elements of FIG. 1; this figure also shows a block diagram of the electronics needed to complete the analog-to-digital conversion.

DESCRIPTION OF PREFERRED EMBODIMENT

The present invention as illustrated in the figures in a two-channel (two-input) digital encoder embodiment having a scanning system contained in a housing 12. In this embodiment, the housing supports bearings for the shaft 15 of a constant-speed electric motor, preferably a hysteresis-type synchronous motor with a rotor 16 and stator 17. The two input shafts, namely, an inner shaft 18 and an outer shaft 19, have the same axis as the motor shaft 15. These inner and outer shafts carry an inner bracket 20 and an outer bracket 21, respectively. A similar bracket 22 is fixed to the housing 12.

The source of illumination for an optical determination of the shaft positions can be either lamps or light-emitting diodes. FIG. 1 shows an inner lamp 23, an outer lamp 24 and a fixed lamp 25 mounted on the inner bracket 20, the outer bracket 21 and the fixed bracket 22, respectively. It also shows bundles of optical fibers 30,30 serving as light pipes to direct illumination into small beams of light. One such beam of light is in a fixed position with respect to the inner shaft, one is fixed with respect to the outer shaft and one is fixed with respect to the housing.

One narrow opaque vane 31 is mounted on the motor shaft 15 so as to intercept the light originating at the inner lamp 23. A second narrow opaque vane 32 is mounted on the same shaft to intercept the beam of light originating at the outer lamp 24. The light originating at the fixed lamp 25 is also intercepted by one of these vanes. Each light interception occurs once per revolution of the shaft 15. A photodetector 40 is mounted on each of the three brackets to receive any light not shaded by its vane. Each photodetector can be a photocell or other illuminating-sensing device. FIG. 2 shows a cross-section of vane 32 crossing the path that a beam of light would take to reach its photocell 40. A total of three photocells are shown and generate three electrical signals.

A cable 48 conducts these signals to some electronic circuitry which includes an oscillator 50. The oscillator supplies pulses to digital-type gates. It can also supply pulses to a circuit which synchronizes the frequency of the power to the motor 16 with a small fraction of its pulse rate; doing so is a practical alternative to having constant motor speed and constant oscillator frequency. Such a circuit is not shown but is well known in the art.

Since this embodiment is a two-input encoder, the circuitry makes two measurements simultaneously and contains two channels. Channel 1 measures the angle of the outer shaft 19 and Channel 2 encodes the inner shaft angle.

In Channel 1, an OR gate 51 combines the pulses from the photocells on both the outer bracket and the fixed bracket. During one revolution of shaft 15, a toggling FLIP-FLOP or bistable multivibrator circuit 52 converts the pair of pulses from this OR gate into a single pulse. The width of this single pulse is proportional to a time interval between two light beam interceptions of vane 32, one when the vane confronts the fixed optical fibers and one when it confronts the optical fibers on the outer bracket. The rest of Channel 1 is what is needed to make a digital measurement of the length of this time interval.

This measurement is performed by the oscillator 50, an AND gate 53 and a Channel 1 Counter 55. This gate passes only the pulses from the oscillator which occur during the FLIP-FLOP output pulse width. A Reset Signal can be derived from the previous AND-gate operation to clear the counter. The cleared counter counts the pulses which it receives during 1 revolution of shaft 15. The counter output consists of a parallel presentation of $n$ binary bits from a number of wires, each of which is associated with one of the bits. The wire carrying the most significant bit or the $n$th bit has an output which is labeled $Y_n$. These outputs present a measurement of the angle of shaft 19.

Channel 2 operates similarly. A Channel 2 AND gate 58 receives pluses from the oscillator 50 but transmits them only during a time interval starting when vane 32 intercepts the light beam of the fixed bracket and ending when vane 31 intercepts the light beam of the inner bracket. A Channel 2 counter 57 thus produces a digital measure of the angular position of the inner shaft 18.

Each of these angular measurements has a range of less than 360 degrees. Mechanical limit stops can be provided to enforce such limits if desired although they are not shown in the drawings. In most cases, flexible wires can serve as adequate connections between the cable 48 and moving electrical elements such as photocells 40,40 and lamps. For example, wires 64 and 65 provide an electrical connection to the photocell on the outer bracket.

The use of optical fibers is not an essential part of the basic function of the encoding. As in the case of most coded-disk encoders, all that is needed is an arrangement consisting of a light source on one side and a photocell on the other side of the vane, disk or whatever interrupts the light beam. However, the bundles of optical fibers 30,30 have several advantages. Mainly, they lend themselves to a certain amount repositioning at the tip. For example, at the extremity of the outer bracket 21, the tip of bundle 30 can have the shape of a wedge 67; by this means, the light from its source 24 becomes a beam of smaller width.

Any such narrowing of the beam tangentially tends to increase the accuracy of the encoding process, particularly in situations which involve temperature changes. In the ultimate case of infinitesimal beamwidth, only noise in the motor speed control remains to prevent encoding accuracy from being equal to the resolution (pulse frequency) level established by the oscillator 50. In practice, a frequency is selected which produces many pulses per revolution of the two vanes. The number of pulses for maximum input angle could be the maximum count available in the digital counter.

There are several ways whereby the desired wedge effect of the optical fiber bundle tips can be obtained. In one way, the end of a bundle of optical fibers, 30 has all individual fibers rearranged to be confined to a flat plane. At this end, the flat array of cylindrical fibers is ground to form a sharp wedge or chisel point. The flats produced by this first grinding are covered with opaque paint, 67. A second grinding operation is then employed to expose a narrow aperture of fiber material at the tip. The vane (vane 32 in FIG. 2) passes so close to the exposed tip of these fibers, is so thin, and is also so close to the photodetector, 40 that angular problems resulting from diffraction and dispersal of light have little opportunity to scatter the light and cause error.

I do not claim broadly the use of digital pulse counters as a means of measuring shaft position. Such use of counters has been described by Susor in U.S. Pat. No. 3,278,929 and Bajars in U.S. Pat No. 3,349,325. In fact, the latter patent discloses a combination of oscillator, gating, counter and reset signal source which is generally similar to this combination in the present invention.

I claim:
1. Apparatus for making digital measurements of shaft angular positions comprising:
   a housing having an axis and having a protruding shaft rotatably mounted on this axis;
   a shaft-mounted bracket supporting a first scanning means for producing and sensing a first beam of light in a direction parallel to the axis of said housing;
   a housing-mounted bracket supporting a second scanning means having a second beam of light similar in direction to that of said shaft mounted bracket;
   an internal shaft rotatably supported by said housing so as to be axially colinear with the axis of said housing;
   motive means to provide controlled rotational speed of said internal shaft;
   an opaque vane mounted on said internal shaft for intercepting the light beam positioned by each of said brackets once per revolution of said internal shaft;

pulse generating means operatively connected to said vanes and said brackets to generate a series of pulses, the beginning of a series and the end of a series of which are marked by an interception by said vane of the beam of light from one of said brackets;

a pulse counter fed by said generating means, the number of pulses fed to said counter by said generating means being proportional to a shaft displacement angle which subtends the first and second light beam light beam interceptions by said vane, thereby providing shaft angle measurement.

2. Apparatus in accordance with claim 1 further comprising:

a second protruding rotatably-mounted shaft coaxial with the rotatably-mounted shaft protruding at the axis of said housing;

a second shaft-mounted bracket with a scanning light beam similar in direction to the first light beam produced by the first said shaft mounted barcket;

a second opaque vane arranged to communicate with second said protruding shaft by alternately interrupting and avoiding the light beam on said second shaft-mounted bracket; and a second pulse generating and counting means for providing a digital measurement of the angular position with respect to a housing-mounted-bracket-confronting position of said second protruding shaft.

3. Apparatus as set forth in claim 1 wherein shaft position ranges are so limited that the means for electrical connections are adequately provided by loosely-coiled wires.

4. Apparatus as set forth in claim 1 wherein optical fibers are used between a means for producing the scanning beam of light at a said bracket and a point closer to a said opaque vane.

5. Apparatus as set forth in claim 4 wherein optical fibers in the vicinity to the path of said vane are positioned to form the shape of a wedge, thereby directing light through a narrow slit along the apex of the wedge.

6. Apparatus as set forth in claim 1 wherein said motive means comprises a nearly constant speed motor to drive said vanes, said vanes having greater flywheel inertia than has the motor so that torsional vibrations coming from the motor are isolated and unable to disturb the damped speed of said vanes.

7. Apparatus for making digital measurements of shaft angle positions comprising:

a housing which supports two coaxial, individually rotatable protruding shafts, the axes of which are the central axis of said housing;

a first opaque vane mounted inside said housing for spinning about the housing central axis;

a second opaque vane fixed to said first vane;

a first scanning bracket comprising a light source which directs a beam of light into a photocell in a direction which is parallel to the central axis of said housing;

a second and third scanning bracket each also comprising a photocell and a light source supplying an axially-directed beam into its corresponding photocell, all three light beams of said brackets being subject to one interception of one of said vanes per revolution of these vanes, one of said brackets being fixed to said housing and each of the other two being fixed to one of the two shafts protruding from said housing;

means for rotating said vanes together around the central axis of said housing with controlled rotational velocity;

a source of pulses having a frequency which is controlled and which bears a fixed relationship to the speed of said vane rotative means; and two channels of pulse-counting circuitry, both of which independently measure the elapsed time between a housing-mounted-bracket light beam interception and a corresponding shaft-mounted-bracket light beam interception by one of said vanes in such a way that each pulse count also represents the shaft angle position of one of the protruding shafts.

8. Apparatus in accordance with claim 7 further comprising:

additional individually rotatable shafts protruding from said housing, all of said shafts in addition to said housing having a single axis;

one additional scanning bracket with a light beam source and photocell for each said additional protruding shaft;

one additional spinning vane fitted for rotation along with other said vanes for each said additional protruding shaft; and one additional channel of pulse counting circuitry for each said additional protruding shaft, said additional channel serving independently of other said channels to perform a digital shaft angle measurement of said additional protruding shaft.

* * * * *